Jan. 1, 1924 1,479,454
M. CARR
MOVING PICTURE FILM REEL
Filed Jan. 26, 1922

INVENTOR.
Michael Carr,
BY
Frautzel and Richards,
ATTORNEYS.

Patented Jan. 1, 1924.

1,479,454

UNITED STATES PATENT OFFICE.

MICHAEL CARR, OF NEW YORK, N. Y.

MOVING-PICTURE-FILM REEL.

Application filed January 26, 1922. Serial No. 531,900.

*To all whom it may concern:*

Be it known that I, MICHAEL CARR, a citizen of the United States, residing at New York, in the county of New York and State of New York, have invented certain new and useful Improvements in Moving-Picture-Film Reels; and I do hereby declare the following to be a full, clear, and exact description of the invention, such as will enable others skilled in the art to which it appertains to make and use the same, reference being had to the accompanying drawings, and to characters of reference marked thereon, which form a part of this specification:

This invention relates, generally, to improvements in winding reels; and the invention has reference, more particularly, to a novel construction of reel upon which moving-picture film strips may be wound.

The invention has for its principal object to provide a reel having a novel construction of hub member provided with a simple improved means for engaging and retaining an end of a moving-picture film strip attached to said hub preparatory to winding up said film strip on the reel.

A further object of the invention is to provide a film strip engaging and retaining means in connection with the hub of a reel which is adapted to afford a very positive and secure grip upon the film strip end, and which is also of such novel arrangement and construction as to render it very easy for the operator to manipulate the film strip in engaging the same in secured relation, notwithstanding the narrow space provided between the sides or flanges of the reel.

Other objects of this invention, not at this time more particularly enumerated, will be clearly understood from the following detailed description of the same.

With the various objects of the invention in view, the same consists, primarily, in the novel construction of reel hereinafter set forth; and, the invention consists, furthermore, in the novel arrangements and combinations of the various devices and parts, as well as in the details of the construction of the same, all of which will be hereinafter more fully described, and then finally embodied in the claims appended hereto, The invention is clearly illustrated in the accompanying drawings, in which:—

Figure 1:
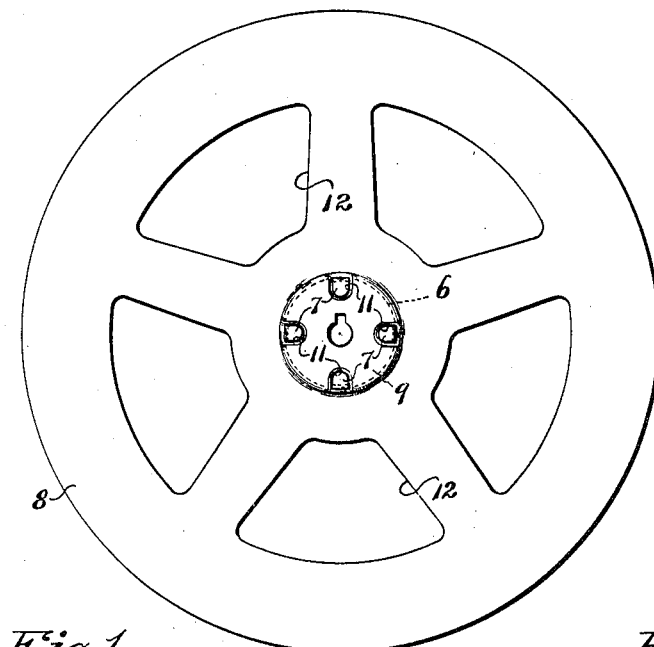
Figure 2:
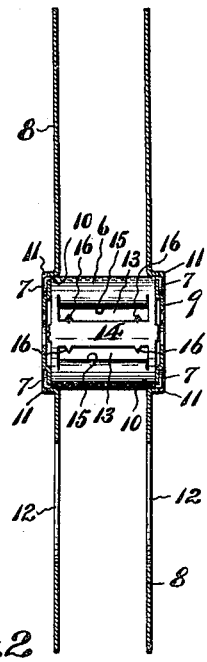
Figure 3:
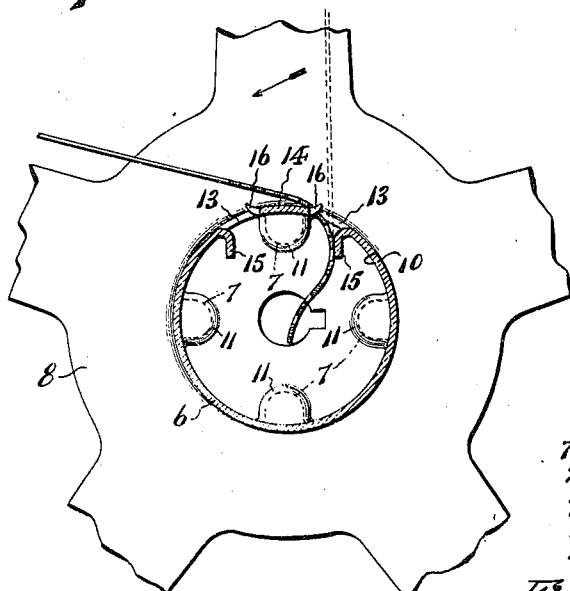
Figure 4:
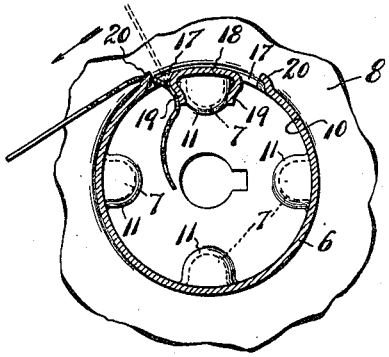
Figure 5:
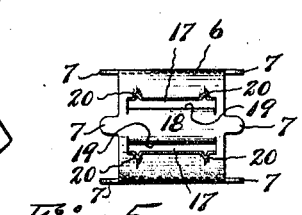

Figure 1 is a side elevation of the novel construction of winding reel for moving picture films made according to and embodying the principles of this invention; Figure 2 is a vertical cross section of the same, showing the hub structure in elevation; Figure 3 is a transverse section through the hub structure of the reel drawn on an enlarged scale, a portion of the side flanges of the reel being broken away, said view illustrating the manner in which a film strip is engaged and retained in connected relation to the hub of the reel; Figure 4 is a detail fragmentary transverse section, similar to that shown in Figure 3, but illustrating a modified construction of film strip engaging and retaining means in connection with the hub; and Figure 5 is a side elevation of a hub, having the side flanges detached therefrom, showing a plan elevation of the modified film strip engaging and retaining means illustrated in Figure 4, said view being drawn on a reduced scale.

Similar characters of reference are employed in all of the hereinabove described views, to indicate corresponding parts.

Referring now to said drawings, the reference character 6 indicates a hub member of the reel, which is substantially cylindrical in form, and which possesses a hollow interior. Said hub member is preferably made of sheet metal, and is provided at its respective ends with a plurality of outwardly projecting lugs or tongues 7, integrally connected therewith, and preferably equally spaced about the end circumferences of said hub member. The reference character 8 indicates the side members or flanges of said reel. Said side members or flanges 8 are provided in their central portions with outwardly dished or off-set portions 9, providing on their inner sides seats or sockets 10, substantially conforming in shape to the ends of the hub member and adapted to receive said hub member ends in seated relation therein, when the parts are assembled together. Said outwardly dished or off-set portions 9 are provided adjacent to their peripheries with openings or slots, corresponding in number and location to the number and location of said lugs or tongues 7 with which each end of said hub member is provided, so that said lugs or tongues 7 may pass through the walls of the side members or flanges to be clenched over the outer surfaces of the same, and thus securely fasten said side members or flanges to the ends of the hub member. It is preferable to provide countersunk seats 11 in the outer faces of said dished or off-set portions 9 into which the free ends of said lugs or tongues 7 are turned, when the same are clenched over in their normal operative holding positions, thus leaving the outer faces of said dished or off-set portions 9 smooth and free from the protrusion of said lugs or tongues. The walls of said side members or flanges 8 may be perforated with openings 12 to lighten the weight of the reel, and to permit the film strip to be observed therethrough.

The novel means for retaining the end of a film strip in operative engaged relation to the hub member 6, comprises the following structure:—

The wall of said hub member 6 is punched through to provide, preferably, a pair of longitudinal slots 13 respectively located on opposite sides of an intermediate bridge-piece 14. In forming said slots 13 the walls of the hub member are cut through on the sides of the slots bordering said bridge-piece 14 and at the ends of said slots, thus leaving portions of the hub material which are bent inwardly and downwardly into the interior of the hub-member at the outer sides of said slots, thereby providing guide or deflecting lips 15, the purpose of which will be subsequently described. Formed in connection with the free edges of said bridge-piece 14, so as to project over each slot 13, are pairs of anchor tits 16, the anchor tits of each pair thereof being spaced apart in correspondence with the spacing of the rows of perforations with which moving picture film strips are provided. The free ends of said anchor tits are preferably inclined upwardly from the circumferential surface of the hub-member.

As above stated it is preferable to provide the slots 13 with the deflecting lips 15 and the cooperating anchor-tits 16 on each side of said bridge-piece 14, thus forming a pair of opposed film retaining means, one of which may be utilized for right hand winding of the film strip on the reel, and the other of which may be utilized for left hand winding of the film strip on the reel; it will be understood, however, that either one or the other of said pair of film retaining means thus provided may be omitted, so as to provide but a single retaining means adapted for either right hand or left hand attachment of the film strip as the case may be, without departing from the spirit or scope of this invention.

When it is desired to attach the end of a film strip to the hub member, preparatory to winding up the same upon the reel, the operator takes the free end of the film strip, and inserts the same downwardly between the side members or flanges 8, and manipulates the same so that the said end will be entered through a slot 13. In thus passing through a slot 13, the end of the film strip is engaged by the adjacent deflecting lip 15 and deflected downwardly and substantially transversely across the interior of the hub member, thereby bending downwardly the extremity of the film strip, so that as the operator swings down the body of the same toward the hub member, and against the bridge-piece 14, the anchor tits 16 will be projected through a pair of the perforations at the sides of the film strip, thus gripping the latter and preventing outward withdrawal of the latter in the direction of its length, all as shown more particularly in Figure 3 of the drawings. It will be apparent that the deflecting lip 15, in thus causing the inward bending and turning of the end of the film strip, also acts as a means for preventing the film strip from lifting away from its engaged relation upon the anchor tits, while at the same time snubbing the body of the film strip around the edge of said bridge-piece 14 bordering the slot through which the film strip is entered. One of the chief advantages of the novel film strip retaining means thus provided lies in the fact that the manipulation of the film, in both the attaching and detaching operations, may be easily managed from points exterior of the peripheries of the side members or flanges 8 of the reel, since all that is required is an inward longitudinal thrust of the film strip to enter its end through a slot 13, and then a downward swing of the film-strip body toward the hub member and its bridge piece (as indicated by the arrow in said Figure 3), to cause the engagement of the film strip perforations over the anchor tits; it being unnecessary to thrust the fingers through the sides of the side members or flanges 8, and consequently there is no necessity for openings in the flanges 8 serving to give access to the film strip, hence the openings 12 shown in the drawings could be omitted if so desired.

Referring now to Figures 4 and 5 of the drawings, there is illustrated thereby a modification of the arrangement of the film strip retaining means, which, however, does not modify the general principles underlying the functions and manner of utilizing the same. In this modified arrangement, I provide a pair of slots 17 located on opposite sides of an intermediate bridge-piece 18. In forming said slots 17, however, the walls of the hub member are cut through on the sides of the slots opposed to the bridge-piece 18, thus leaving portions of the hub material, at each side of the latter and at the inner sides of the slots, which are bent inwardly and downwardly into the interior of the hub member, thereby providing guide or deflecting lips 19, which in this case may, if desired, take the curvilinear shape shown in Figure 4. The opposite or outer margins of said slots are deformed outwardly, as shown, to provide the pairs of anchor tits 20 which project outwardly or upwardly from the circumferential surface of the hub-member. It will be clear from an inspection of Figure 4 of the drawings that the manner of attaching the film strip with said modified construction of retaining means is substantially the same as already above described, and that the principles governing the operations of gripping and holding the end of the film strip attached are also in all essential respects the same.

I am aware that some changes may be made in the various arrangements and combinations of the several devices and parts, as well as in the details of the construction of the same, without departing from the scope of this invention as set forth in the foregoing specification, and as defined in the appended claims. Hence, I do not limit my invention to the exact arrangements and combinations of the various devices and parts as described in said specification, nor do I limit myself to the exact details of the construction of said parts as illustrated in the accompanying drawings.

I claim:—

1. In a film reel, a hollow hub having a slot in its walls adapted to admit the extremity of a film strip endwise therethrough, and a pair of anchor tits projecting from the margin of one side of said slot with their free ends inclined upwardly slightly beyond the outer circumference of said hub and disposed to engage a pair of perforations in the film strip.

2. In a film reel, a hollow hub having a slot in its walls adapted to admit the extremity of a film strip endwise therethrough, an inwardly projecting deflecting lip bordering one side of said slot, and a pair of anchor tits at the opposite side of said slot with their free ends inclined upwardly slightly beyond the outer circumference of said hub and disposed to engage a pair of perforations in the film strip.

3. In a film reel, a hollow hub having a pair of slots spaced circumferentially apart, said slots being adapted for selective use to admit the extremity of a film strip endwise therethrough, a pair of anchor tits on one side of each slot disposed to engage a pair of perforations in the film, one pair of anchor tits projecting relative to one slot in one direction, and the other pair of anchor tits projecting relative to the other slot in the opposite direction.

4. In a film reel, a hollow hub having a pair of slots spaced circumferentially apart, said slots being adapted for selective use to admit the extremity of a film strip endwise therethrough, a pair of anchor tits on one side of each slot disposed to engage a pair of perforations in the film, one pair of anchor tits projecting relative to one slot in one direction, and the other pair of anchor tits projecting relative to the other slot in the opposite direction, each slot having bordering the side thereof opposed to the anchor tits associated therewith an inwardly projecting deflecting lip.

5. In a film reel, a hub, side flanges, said side flanges having outwardly pressed central portions providing seats on their inner sides to receive the ends of said hub, said hub having clenching lugs at their respective ends to project through said side flanges, said clenching lugs being turned over the outer surface of said central portions of said side flanges to secure the latter to the ends of the hub, countersunk seats in the outer surfaces of said central portions to receive said turned over clenching lugs, said hub having a hollow interior, said hub having in its walls a slot adapted to admit endwise therethrough the extremity of a film strip, and a pair of anchor tits at one side of said slot disposed to engage a pair of perforations in the film strip.

6. In a film reel, a hub, side flanges, said side flanges having outwardly pressed central portions providing seats on their inner sides to receive the ends of said hub, said hub having clenching lugs at its respective ends to project through said side flanges, said clenching lugs being turned over the outer surface of said centrol portions of said side flanges to secure the latter to the ends of the hub, counter-sunk seats in the outer surfaces of said central portions to receive said turned over clenching lugs, said hub having a hollow interior, said hub having in its walls a slot adapted to admit endwise therethrough the extremity of a film strip, a pair of anchor tits at one side of said slot disposed to engage a pair of perforations in the film strip, and an inwardly projected deflecting lip, bordering the opposite side of said slot to deflect or bend the inserted end of said film strip to depress an outlying portion of the latter toward said anchor tits.

In testimony, that I claim the invention set forth above I have hereunto set my hand this 23rd day of January, 1922.

MICHAEL CARR.

Witnesses:
ADOLPH HANSEN,
GEORGE D. RICHARDS.